US010499219B2

(12) United States Patent
Ideguchi et al.

(10) Patent No.: US 10,499,219 B2
(45) Date of Patent: Dec. 3, 2019

(54) INFORMATION SHARING SYSTEM, COMPUTER, AND INFORMATION SHARING METHOD WITHOUT USING CONFIDENTIAL INFORMATION PROVIDED IN ADVANCE

(71) Applicant: Hitachi, Ltd., Chiyoda-ku, Tokyo (JP)

(72) Inventors: Kota Ideguchi, Tokyo (JP); Eriko Ando, Tokyo (JP); Makoto Kayashima, Tokyo (JP)

(73) Assignee: Hitachi, Ltd., Tokyo (JP)

(*) Notice: Subject to any disclaimer, the term of this patent is extended or adjusted under 35 U.S.C. 154(b) by 212 days.

(21) Appl. No.: 15/632,610

(22) Filed: Jun. 26, 2017

(65) Prior Publication Data
US 2018/0006810 A1 Jan. 4, 2018

(30) Foreign Application Priority Data

Jul. 4, 2016 (JP) .................... 2016-132149

(51) Int. Cl.
H04L 29/06 (2006.01)
H04W 4/48 (2018.01)
H04L 9/32 (2006.01)
H04L 9/08 (2006.01)
H04W 4/70 (2018.01)
H04W 12/02 (2009.01)
H04W 12/04 (2009.01)
(Continued)

(52) U.S. Cl.
CPC ............. *H04W 4/48* (2018.02); *H04L 9/0844* (2013.01); *H04L 9/3247* (2013.01);
(Continued)

(58) Field of Classification Search
CPC . H04L 63/0442; H04L 63/061; H04L 63/123; H04L 63/0823; H04L 9/30;
(Continued)

(56) References Cited

U.S. PATENT DOCUMENTS 9,246,884 B1  1/2016 Pfab et al.
9,641,329 B2* 5/2017 Takahashi ............. H04L 9/0894
(Continued)

FOREIGN PATENT DOCUMENTS

WO  WO 00/69113 A1  11/2000

OTHER PUBLICATIONS

Extended European Search Report issued in counterpart European Application No. 17178410.1 dated Nov. 20, 2017 (12 pages).

Primary Examiner — Sher A Khan
(74) Attorney, Agent, or Firm — Crowell & Moring LLP

(57) ABSTRACT

An information sharing system includes a server and an in-vehicle system. The server includes: a first storage part; a first key generation part configured to generate a first private key and a first public key, if keys can be exchanged with the in-vehicle system; and a signature generation part configured to generate a signature value of the first public key using a server private key. The in-vehicle system includes: a second storage part configured to store a public key certificate including a server public key; a signature verification part configured to verify the first public key and a signature value received from the server, using a public key certificate; and a second key generation part configured to generate a second private key and a second public key, if a combination of the first public key and the signature value is correct as a result of the verification.

9 Claims, 8 Drawing Sheets

(51) Int. Cl.
*H04W 4/021* (2018.01)
*H04W 12/00* (2009.01)

(52) U.S. Cl.
CPC ........ *H04L 9/3263* (2013.01); *H04L 63/0442* (2013.01); *H04L 63/061* (2013.01); *H04L 63/123* (2013.01); *H04W 4/70* (2018.02); *H04W 12/02* (2013.01); *H04W 12/04* (2013.01); *H04L 63/0823* (2013.01); *H04L 2209/84* (2013.01); *H04W 4/021* (2013.01); *H04W 12/00503* (2019.01)

(58) Field of Classification Search
CPC . H04L 9/32; H04L 9/0825; H04L 9/08; H04L 9/0844; H04L 9/3247; H04L 9/33263; H04W 12/02; H04W 12/04
See application file for complete search history.

(56) References Cited

U.S. PATENT DOCUMENTS

| | | | |
|---|---|---|---|
| 2008/0232583 A1 | 9/2008 | De Crescenzo et al. | |
| 2009/0103726 A1* | 4/2009 | Ahmed | H04L 9/0668 380/46 |
| 2009/0106551 A1* | 4/2009 | Boren | H04L 9/0822 713/158 |
| 2010/0040234 A1 | 2/2010 | Alrabady et al. | |
| 2012/0159170 A1* | 6/2012 | Lee | H04W 12/02 713/169 |
| 2013/0067220 A1* | 3/2013 | Ando | H04L 9/3268 713/156 |
| 2013/0227648 A1* | 8/2013 | Ricci | G06F 3/0484 726/3 |
| 2015/0067338 A1 | 3/2015 | Gero et al. | |
| 2015/0116135 A1* | 4/2015 | Sobue | G08G 1/0112 340/995.12 |
| 2015/0185034 A1* | 7/2015 | Abhyanker | G01C 21/36 701/23 |
| 2015/0279128 A1* | 10/2015 | Izumi | G07C 5/0808 701/29.1 |
| 2016/0182170 A1* | 6/2016 | Daoura | H04W 4/029 455/3.01 |
| 2016/0323741 A1* | 11/2016 | Lee | H04W 12/06 |
| 2016/0330182 A1* | 11/2016 | Jeon | H04L 63/062 |
| 2017/0085543 A1* | 3/2017 | Choi | H04L 63/061 |
| 2017/0331795 A1* | 11/2017 | Martin | H04L 63/0428 |

* cited by examiner

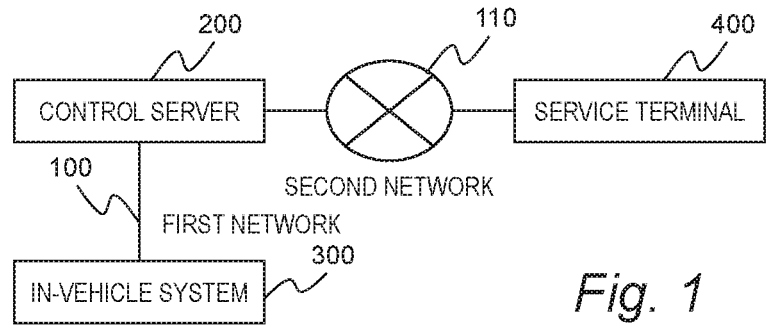
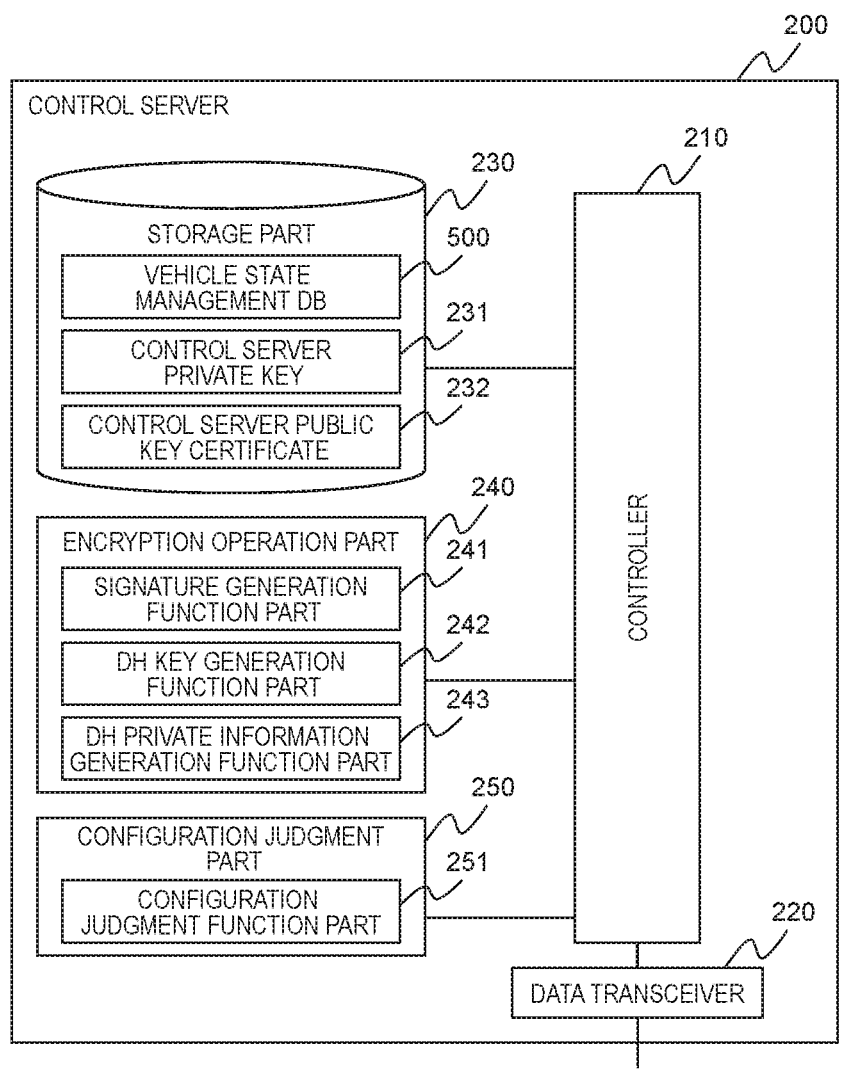

INFORMATION SHARING SYSTEM, COMPUTER, AND INFORMATION SHARING METHOD WITHOUT USING CONFIDENTIAL INFORMATION PROVIDED IN ADVANCE

CLAIM OF PRIORITY

The present application claims priority from Japanese patent application JP 2016-132149 filed on Jul. 4, 2016, the content of which is hereby incorporated by reference into this application.

BACKGROUND OF THE INVENTION

The present invention relates to an information sharing system, a computer, and an information sharing method.

Some in-vehicle systems installed in a vehicle need to share confidential information with a server in order to securely communicate with the server. The in-vehicle system and the server use the shared confidential information as a key, and securely communicate with each other via cryptography.

In a case where confidential information is not shared between the in-vehicle system and the server in advance, the confidential information needs to be shared between the in-vehicle system and the server at first. There is a known technology to make it possible to share confidential information between a server and an in-vehicle system that do not have shared confidential information in advance (see Patent Document 1, for example).

According to Patent Document 1, a key distributing device and a key receiving device are each given an asymmetric key in advance, and the key distributing device securely distributes a new key to the key receiving device using this asymmetric key. The asymmetric key is a pair of a private key and public key. If the key distributing device is a server, and the key receiving device is an automobile, the key, which is the confidential information, can be shared between the server and the automobile, which do not have shared information to begin with, using the technology disclosed in WO 00/69113 A1.

SUMMARY OF THE INVENTION

In the method disclosed in WO 00/69113 A1, it is necessary for the server and the vehicle to have an asymmetric key saved therein as the confidential information. In order to save the confidential information in the vehicle in advance, the confidential information needs to be stored in a manufacturing plant, for example. This increases the production cost.

In a case where confidential information is not installed in a vehicle in advance in order to cut the production cost or the like, it would not be possible for the server and the vehicle to securely share confidential information with the method described in WO 00/69113 A1.

In view of such a problem, the present invention is aiming at providing a method to securely share new confidential information between a server and a vehicle when confidential information is not provided to the vehicle in advance.

The representative one of inventions disclosed in this application is outlined as follows. There is provided an information sharing system, comprising a server, and an in-vehicle system that includes a vehicle configuration management part configured to collect configuration information for a vehicle in which said in-vehicle system is installed. The server includes: a first storage part configured to store a server private key, and vehicle state management information indicating a state of the vehicle, the vehicle state management information being used to determine whether or not keys can be exchanged with the in-vehicle system; a judgment part configured to compare the vehicle state management information with the configuration information, thereby determining whether keys can be exchanged with the in-vehicle system or not; a first key generation part configured to generate a first private key and a first public key, in a case where it is determined that keys can be exchanged with the in-vehicle system; and a signature generation part configured to generate a signature value of the first public key using the server private key. The in-vehicle system further includes: a second storage part configured to store a public key certificate including the server public key; a signature verification part configured to verify the first public key and the signature value received from the server, using the public key certificate; and a second key generation part configured to generate a second private key and a second public key, in a case where a combination of the first public key and the signature value is correct as a result of the verification.

According to an aspect of the present invention, it is possible to securely share new confidential information between a server and an in-vehicle system that is not given the confidential information in advance. The problems, configurations, and effects other than those described above will become apparent by the descriptions of embodiments below.

BRIEF DESCRIPTION OF THE DRAWINGS

The present invention can be appreciated by the description which follows in conjunction with the following figures, wherein:

FIG. 1 is a block diagram illustrating an overall configuration of an information sharing system of a first embodiment;

FIG. 2 is a block diagram illustrating a schematic configuration of a control server of the first embodiment;

DETAILED DESCRIPTION OF THE INVENTION

Figure 3:
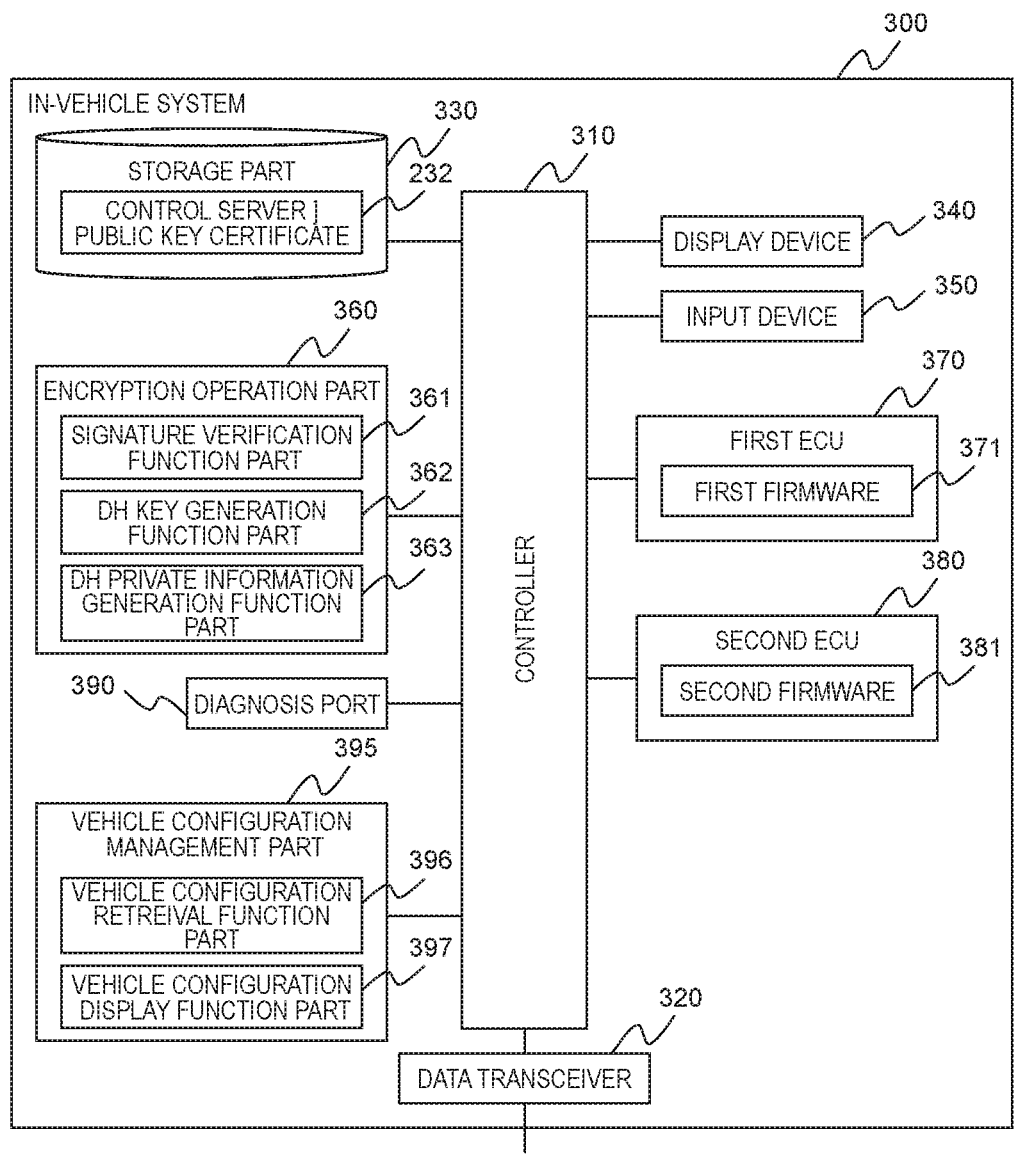
FIG. 3 is a block diagram illustrating a schematic configuration of an in-vehicle system of the first embodiment.

Embodiments of a system that allows a server and a vehicle (in-vehicle system), which is not given confidential information in advance, to securely share confidential information in a network will be explained below.

First Embodiment

FIG. 1 is a block diagram illustrating the overall configuration of the information sharing system of a first embodiment.

The information sharing system of the first embodiment includes a control server 200, an in-vehicle system 300, and a service terminal 400.

In the first embodiment, the control server 200 and the in-vehicle system 300 are connected to each other via a first network 100. The control server 200 and the service terminal 400 are connected to each other via a second network 110. The first network 100 and the second network 110 do not necessarily have to be different networks but may be the same network.

The in-vehicle system 300 is installed in a computer system of a vehicle (automobile, for example). The control server 200 is installed in a computer system. The service terminal 400 is installed in a computer system.

The first network 100 may include a wireless network. The second network 110 may include a wireless network, or may include wired network only.

FIG. 2 is a block diagram illustrating the schematic configuration of the control server 200 of the first embodiment.

As illustrated in the figure, the control server 200 includes a controller 210, a data transceiver 220, a storage part 230, an encryption operation part 240, and a configuration judgment part 250.

The control server 200 is controlled by the controller 210, and is connected to the first network 100 and the second network 110 via the data transceiver 220.

The storage part 230 can store data therein, and specifically has stored therein a control server private key 231, a control server public key certificate 232, and a vehicle state management DB 500.

The control server public key certificate 232 includes a control server public key. The control server public key included in the control server public key certificate 232 pairs up with the control server private key 231, and is used to generate a signature by the public key signature algorithm and to verify the signature.

The vehicle state management DB 500 includes information that indicates the state of a vehicle on whether the keys can be exchanged or not.

The encryption operation part 240 includes a signature generation function part 241, a DH (Diffie-Helman) key generation function part 242, and a DH private information generation function part 243.

In a case where the signature generation function part 241 receives the data to generate a signature for, the signature generation function part 241 calculates a signature generation function Sign using the control server private key stored in the storage part 230, thereby generating a signature value of the data to generate a signature for. Formula 1 indicates the signature value generated by the signature generation function Sign.

$$s=\mathrm{Sign}(sk,m) \quad \text{Formula 1}$$

In the formula 1, sk is the control server private key 231, m is the data to be signed, and s is the signature value.

The DH key generation function part 242 generates the first DH private key and the first DH public key using the DH key exchange algorithm. The DH key generation function part 242 generates a whole number that is 0 or greater and (p−2) or smaller randomly as the first DH private key, and then performs Formula 2, thereby generating the first DH public key corresponding to the first DH private key.

$$y=g^x \quad \text{Formula 2}$$

In the formula 2, x is the first DH private key, g is the public parameter of the source, and y is the first DH public key. Here, p and g are public parameters and are stored in the encryption operation part 240. The DH private information generation function part 243 generates private information using the DH key exchange algorithm. Specifically, the DH private information generation function part 243 receives the first DH private key and the second DH public key, and performs Formula 3, thereby generating the private information.

$$z=t^x \quad \text{Formula 3}$$

In the formula 3, x is the first DH private key, t is the second DH public key, and z is the private information. The second DH public key will be explained in detail below.

The configuration judgment part 250 includes a configuration judgment function part 251.

The configuration judgment function part 251 receives vehicle configuration information of the vehicle requiring key exchange from the controller 210, and accesses the vehicle state management DB 500. Then the configuration judgment function part 251 matches the information of the vehicle state management DB 500 with the received vehicle configuration information, thereby determining whether the keys can be exchanged or not, and thereafter, the configuration judgment function part 251 returns the determination result to the controller 210.

In a case where the received vehicle configuration information matches the information of the vehicle state management DB 500, the configuration judgment function part 251 determines that the keys can be exchanged, and in a case where the information does not match, the configuration judgment function part 251 determines that the keys cannot be exchanged. The configuration judgment function part 251 may determine that the received vehicle configuration information matches the information of the vehicle state management DB 500 in a case where respective information fulfills prescribed conditions. This will be explained in detail below.

The control server 200 is a computer that includes a processor, a memory, a storage device, and a communication interface.

The processor of the control server 200 executes the programs stored in the memory, thereby realizing the controller 210, the encryption operation part 240, and the configuration judgment part 250.

The memory of the control server 200 includes a ROM that is a non-volatile storage element, and a RAM that is a volatile storage element. The ROM stores therein non-variable programs (such as BIOS). The RAM is a high-speed volatile storage element such as a DRAM (Dynamic Random Access Memory), and temporarily stores programs for the processor to run and data used for running the programs.

The storage device of the control server 200 constitutes the storage part 230. The storage device of the control server 200 is constituted of a large-capacity non-volatile storage device such as a hard disk drive (HDD) and flash memory (SSD), for example, and stores therein programs to be executed by the processor and data used to execute the programs. That is, the programs are read out from the storage device, loaded to the memory, and run by the processor.

The communication interface of the control server 200 is an interface device that constitutes the data transceiver 220 and that controls communications with other devices (such as the service terminal 400 and the in-vehicle system 300) in accordance with a prescribed protocol.

The programs run by the processor of the control server 200 are provided to the control server 200 through a removable media (CD-ROM, flash memory, and the like) or a network, and are stored in the storage device, which is a non-temporary storage medium. Thus, it is preferable that the control server 200 have an interface to read the data from removable media.

The control server 200 is a computer system physically constructed on one computing device, or physically or logically constructed on a plurality of computing devices. The programs described above may be operated on separate threads on the same computing device, or may be operated on a virtual computer constructed on a plurality of physical computer resources. The control server 200 may be configured with a cloud system.

All or a part of the controller 210, the encryption operation part 240, and the configuration judgment part 250 of the control server 200 may be constituted of a physical integrated circuit (such as a field-programmable gate array) or the like.

FIG. 3 is a block diagram illustrating a schematic configuration of the in-vehicle system 300 of the first embodiment.

The in-vehicle system 300 is constituted of a computer installed in a vehicle.

As illustrated in the figure, the in-vehicle system 300 includes a controller 310, a data transceiver 320, a storage part 330, a display device 340, an input device 350, an encryption operation part 360, a first ECU (Engine-control-unit) 370, a second ECU 380, a diagnosis port 390, and a vehicle configuration management part 395.

The in-vehicle system 300 is controlled by the controller 310, and is connected to the first network 100 via the data transceiver 320.

The controller 310 has two operation modes; the normal mode and the key exchange mode. In the initial state, the controller 310 operates in the normal mode, and switches to the key exchange mode after receiving an input through the input device 350.

The storage part 330 stores data, or more specifically, the control server public key certificate 232. The storage part 330 may also store the collected vehicle configuration information.

The control server public key certificate 232 of the storage part 330 is the same as the control server public key certificate 232 of the control server 200, and includes the control server public key.

The vehicle configuration information of this embodiment includes vehicle information indicating the latest status of the vehicle in which the in-vehicle system 300 is installed. The vehicle configuration information includes a vehicle ID unique to each vehicle, ECU model information of each ECU of the in-vehicle system 300, and version information of the firmware installed in each ECU.

The encryption operation part 360 includes a signature verification function part 361, a DH key generation function part 362, and a DH private information generation function part 363.

The signature verification function part 361 receives signature target data, and a signature value corresponding to the signature target data. The signature verification function part 361 then verifies a pair of the signature target data and the signature value by calculating a signature verification function Verify using the control server public key certificate 232. Formula 4 indicates the verification result by the signature verification function Verify.

$$v = \text{Verify}(cert, m, s) \quad \text{Formula 4}$$

In the formula 4, cert is the control server public key certificate 232, m is the signature target data, s is the signature value, and v is the signature verification result. The function Verify returns 0 or 1 as the signature verification result. 0 means a failed verification (the combination of the signature target data and the signature value is improper), and 1 means a successful verification (the combination of the signature target data and the signature value is proper).

The DH key generation function part 362 generates the second DH private key and the second DH public key using the DH key exchange algorithm. The DH key generation function part 362 generates a whole number that is 0 or greater and (p−2) or smaller randomly as the second DH private key, and then performs Formula 5, thereby generating the corresponding second DH public key.

$$t = g^u \quad \text{Formula 5}$$

In the formula 5, u is the second DH private key, g is the public parameter of the source, and t is the second DH public key. Here, p and g are public parameters and are stored in the encryption operation part 360. Also, p and g in the in-vehicle system 300 are the same as p and g stored in the encryption operation part 240 of the control server 200.

The DH private information generation function part 363 generates private information using the DH key exchange algorithm. Specifically, the DH private information generation function part 363 receives the second DH private key and the second DH public key, and performs Formula 6, thereby generating the private information.

$$z = y^u \quad \text{Formula 6}$$

In the formula 6, u is the second DH private key, y is the first DH public key, and z is the private information. The private information z is the same as the private information generated by the DH private information generation function part 243 of the control server 200.

The first ECU 370 has the first firmware 371. The second ECU 380 has the second firmware 381.

The number of the ECUs in the in-vehicle system 300 is not limited to two, and may include any number of ECUs.

The controller 310, the data transceiver 320, the display device 340, and the input device 350 of the in-vehicle system 300 may be constituted of different ECUs, respectively. Alternatively, a plurality of functions may be constituted of a single ECU.

Examples of the ECU constituting the controller 310 include a central gateway. Examples of the ECU constituting the data transceiver 320 include TCU.

The vehicle configuration management part 395 includes a vehicle configuration retrieval function part 396 and a vehicle configuration display function part 397.

The vehicle configuration retrieval function part 396 collects vehicle configuration information from a device installed in the vehicle via the controller 310. The vehicle configuration retrieval function part 396 may store the collected vehicle configuration information in the storage part 330.

The vehicle configuration display function part 397 displays the collected vehicle configuration information in the display device 340.

The computer constituting the in-vehicle system 300 includes a processor, a memory, a storage device, the display device 340, the input device 350, and a communication interface.

The processor of the in-vehicle system 300 executes the programs stored in the memory, thereby realizing the controller 310, the encryption operation part 360, the vehicle configuration management part 395, and the data transceiver 320.

The memory of the in-vehicle system 300 includes a ROM that is a non-volatile storage element, and a RAM that is a volatile storage element. The ROM stores therein non-variable programs (such as BIOS). The RAM is a high-speed volatile storage element such as a DRAM (Dynamic Random Access Memory), and temporarily stores programs for the processor to run and data used for running the programs.

The storage device of the in-vehicle system 300 constitutes the storage part 330. The storage device of the in-vehicle system 300 is constituted of a large-capacity non-volatile storage device such as a hard disk drive (HDD) and flash memory (SSD), for example, and stores therein programs to be executed by the processor and data used to execute the programs. That is, the programs are read out from the storage device, loaded to the memory, and run by the processor.

The communication interface of the in-vehicle system 300 is an interface device that constitutes the data transceiver 320 and that controls communications with other devices (such as the control server 200) in accordance with a prescribed protocol.

The programs run by the processor of the in-vehicle system 300 are provided to the in-vehicle system 300 through a removable media (CD-ROM, flash memory, and the like) or a network, and are stored in the storage device, which is a non-temporary storage medium. Thus, it is preferable that the in-vehicle system 300 have an interface to read the data from removable media. All or a part of the function blocks of the in-vehicle system 300 may be constituted of a physical integrated circuit (such as a field-programmable gate array) or the like.

Figure 4:
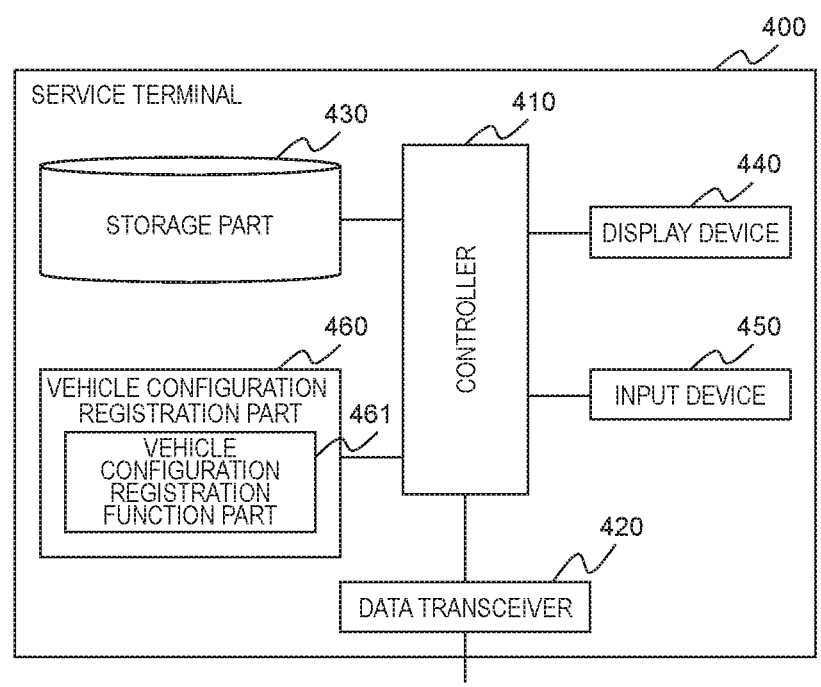
FIG. 4 is a block diagram illustrating a schematic configuration of a service terminal of the first embodiment.

FIG. 4 is a block diagram illustrating a schematic configuration of the service terminal 400 of the first embodiment.

As illustrated in the figure, the service terminal 400 includes a controller 410, a data transceiver 420, a storage part 430, a display device 440, an input device 450, and a vehicle configuration registration part 460.

The service terminal 400 is controlled by the controller 410, and is connected to the second network 110 via the data transceiver 420.

The vehicle configuration registration part 460 includes a vehicle configuration registration function part 461.

The vehicle configuration registration function part 461 displays a vehicle configuration registration form in the display device 440, and retrieves vehicle configuration information entered in the vehicle configuration registration form from the input device 450. Then the vehicle configuration registration function part 461 sends the retrieved vehicle configuration information to the control server 200 via the data transceiver 420.

The service terminal 400 of the first embodiment is installed at a dealer, a maintenance facility, and the like, for example. Limited personnel such as a dealer, workers at the maintenance facility, and mechanics can log into the service terminal 400.

The service terminal 400 is constituted of a computer that includes a processor, a memory, a storage device, the display device 440, the input device 450, and a communication interface.

The processor of the service terminal 400 executes the programs stored in the memory, thereby realizing the controller 410, the vehicle configuration registration part 460, and the data transceiver 420.

The memory of the service terminal 400 includes a ROM that is a non-volatile storage element, and a RAM that is a volatile storage element. The ROM stores therein non-variable programs (such as BIOS). RAM is a high-speed volatile storage element such as a DRAM (Dynamic Random Access Memory), and temporarily stores programs for the processor to run and data used for running the programs.

The storage device of the service terminal 400 constitutes the storage part 430. The storage device of the service terminal 400 is constituted of a large-capacity non-volatile storage device such as a hard disk drive (HDD) and flash memory (SSD), for example, and stores therein programs to be executed by the processor and data used to execute the programs. That is, the programs are read out from the storage device, loaded to the memory, and run by the processor.

The communication interface of the service terminal 400 is an interface device that constitutes the data transceiver 420 and that controls communications with other devices (such as the control server 200) in accordance with a prescribed protocol.

The programs run by the processor of the service terminal 400 are provided to the service terminal 400 through a removable media (CD-ROM, flash memory, and the like) or a network, and are stored in the storage device, which is a non-temporary storage medium. Thus, it is preferable that the service terminal 400 have an interface to read the data from removable media.

The service terminal 400 is a computer system physically constructed on one computing device, or physically or logically constructed on a plurality of computing devices. The programs described above may be operated on separate threads on the same computing device, or may be operated on a virtual computer constructed on a plurality of physical computer resources. All or a part of the function blocks of the service terminal 400 may be constituted of a physical integrated circuit (such as a field-programmable gate array) or the like.

Figure 5:
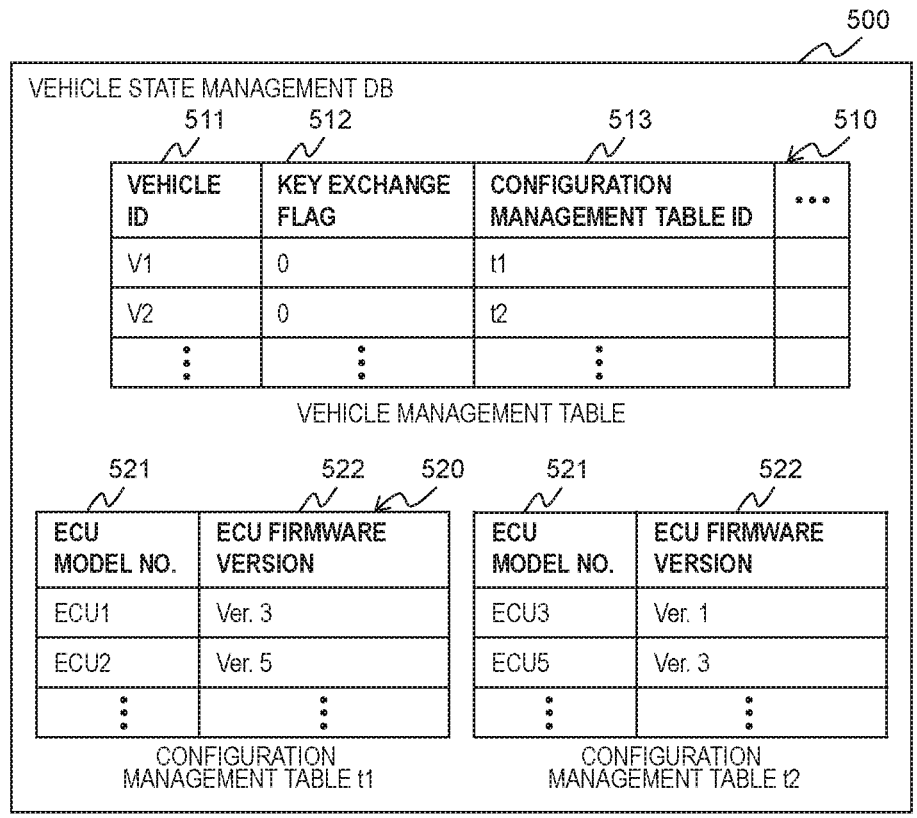
FIG. 5 is a diagram illustrating a schematic configuration of a vehicle state management DB of the first embodiment.

FIG. 5 is a diagram illustrating the schematic configuration of a vehicle state management DB 500 of the first embodiment.

The vehicle state management DB 500 includes a vehicle management table 510 and one or a plurality of configuration management tables 520.

As illustrated in FIG. 5, the vehicle management table 510 includes a vehicle ID column 511, a key exchange flag column 512, and a configuration management table ID column 513. Each record in the vehicle management table 510 corresponds to information of one vehicle.

The vehicle ID column 511 has stored therein a vehicle ID. The key exchange flag column 512 holds a binary value that indicates whether the vehicle allows the key to be exchanged or not. In this embodiment, in a case where the key exchange flag column 512 is 1, the vehicle can perform the key exchange, and in a case where the key exchange flag column 512 is 0, the vehicle cannot perform the key exchange. The initial setting value of the key exchange flag column 512 is 0.

The configuration management table ID column 513 has stored therein ID for each configuration management table 520 that holds the vehicle configuration information of the in-vehicle system 300 of each vehicle.

As illustrated in FIG. 5, the configuration management table 520 includes an ECU model column 521 and an ECU firmware version column 522. One configuration management table 520 is provided for one vehicle. That is, the number of configuration management table 520 is the same as the number of vehicles managed by the control server 200.

Each record in the configuration management table 520 corresponds to each ECU of each vehicle. The ECU model column 521 stores therein the model information of ECU, and the ECU firmware version column 522 stores therein the version information of the ECU firmware.

Figure 6:
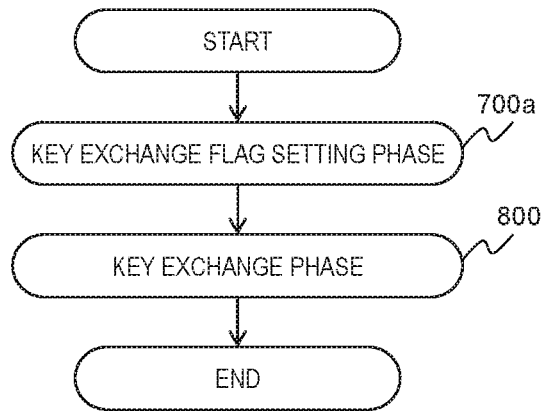
FIG. 6 is a flowchart of a process in which a vehicle and a control server exchange private information in the first embodiment.

FIG. 6 is a flowchart of the process in which the vehicle and the control server 200 exchange private information in the first embodiment.

In the beginning, the vehicle does not have private information. After the in-vehicle system 300 and the control server 200 go through a key exchange flag setting phase 700 and a key exchange phase 800 in this order, the vehicle and the control server 200 share private information.

The key exchange flag setting phase 700 of the first embodiment is described as the key exchange flag setting phase 700a, and the key exchange flag setting phase 700 of a second embodiment is described as the key exchange flag setting phase 700b.

Figure 7:
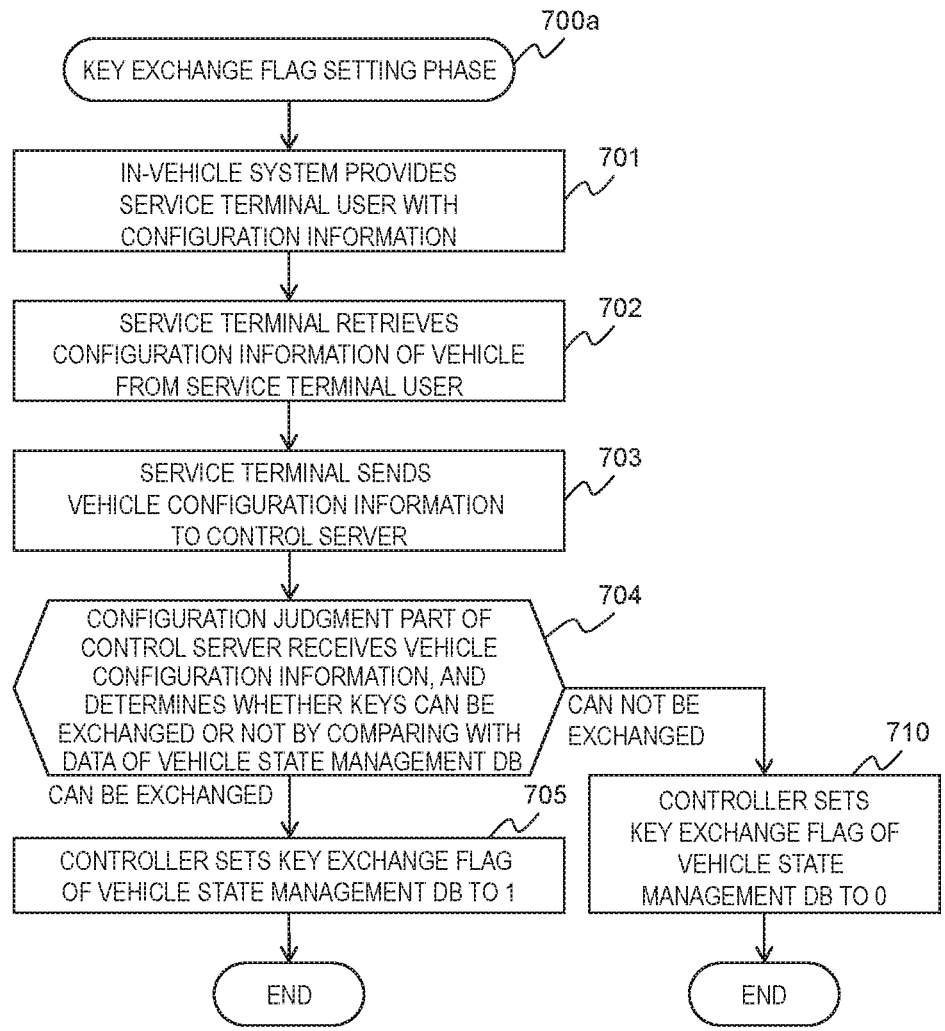
FIG. 7 is a flowchart of a key exchange flag setting phase of the first embodiment.

The key exchange flag setting phase 700a is a phase in which the control server 200 sets the key exchange flag column 512 of the vehicle management table 510 in the vehicle state management DB 500. The processes of this phase are illustrated in the flowchart of FIG. 7, and will be explained below.

Figure 8:
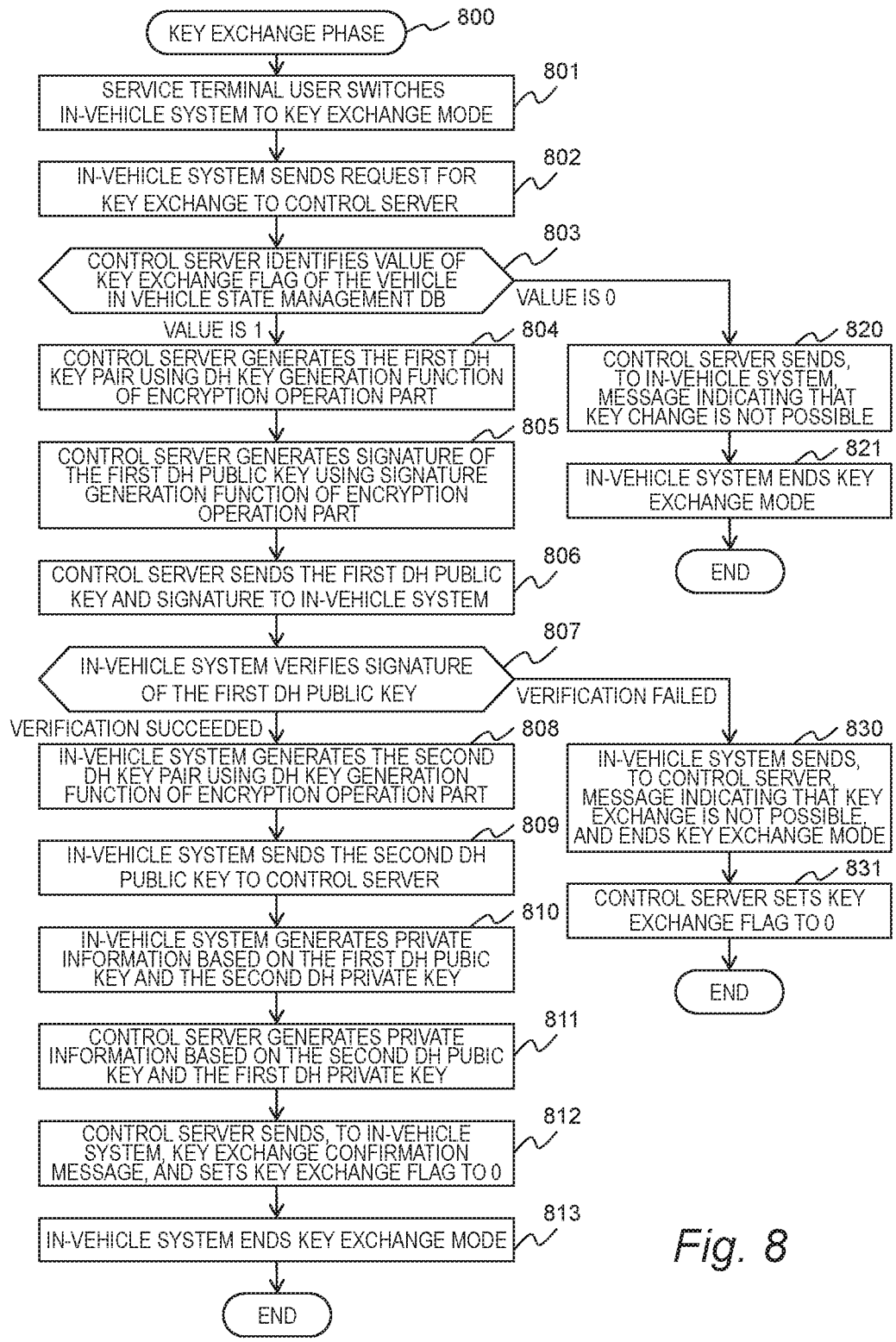
FIG. 8 is a flowchart of a key exchange phase of the first embodiment.

The key exchange phase 800 is a phase in which the control server 200 and the in-vehicle system 300 exchange keys. The processes of this phase are illustrated in the flowchart of FIG. 8, and will be explained below.

In the first embodiment, the key exchange flag setting phase 700a and the key exchange phase 800 are conducted when the vehicle is present near a location where the service terminal 400 is installed. This is because the service terminal user that operates the service terminal 400 directly retrieves information from the vehicle while operating the service terminal 400. As long as the vehicle is present in a location that can fulfill the purpose, there is no limitation on the location of the vehicle.

The service terminal user performs manual procedures in the key exchange flag setting phase 700a and the key exchange phase 800. The service terminal user is a user authorized to log into the service terminal 400.

FIG. 7 is a flowchart of the key exchange flag setting phase 700a of the first embodiment.

First, the in-vehicle system 300 displays the vehicle configuration information in the display device 340 using the vehicle configuration management part 395 so that the service terminal user physically accessing the vehicle can confirm the vehicle configuration information (Step 701).

The service terminal user registers the vehicle configuration information, which is displayed in the display device 340 of the in-vehicle system 300, in the service terminal 400 using the vehicle configuration registration part 460 of the service terminal 400. This way, the service terminal 400 retrieves the configuration information of the vehicle (Step 702).

The controller 410 of the service terminal 400 sends the registered vehicle configuration information to the control server 200 via the data transceiver 420 (Step 703). The data transceiver 220 receives the vehicle configuration information.

The controller 210 of the control server 200 sends the vehicle configuration information obtained through the data transceiver 220 to the configuration judgment part 250. The configuration judgement function part 251 of the configuration judgment part 250 compares the received vehicle configuration information with the information obtained by accessing the vehicle state management DB 500, thereby determining whether the keys can be exchanged or not (Step 704).

Specifically, the configuration judgment function part 251 determines whether the received vehicle configuration information matches the information of the configuration management table 520 of the vehicle that corresponds to the vehicle configuration information, and in a case where they match, the configuration judgment function part 251 determines that the keys can be exchanged.

In the example of FIG. 5, the vehicle configuration information indicates the version of the ECU firmware. The configuration judgment function part 251 determines that the keys can be exchanged in a case where the version of the ECU firmware indicated by the configuration management table 520 matches the version of the ECU firmware indicated by the vehicle configuration information.

The configuration judgment function part 251 determines that the keys can be exchanged in a case where the received vehicle configuration information matches the information of the vehicle state management DB 500, but the judgment method is not limited to this. For example, in a case where the vehicle configuration information of a vehicle having the vehicle ID vid is defined as vconf, information of the configuration management table 520 corresponding to the configuration management table ID column 513 of a record in which the vehicle ID 511 is vid in the vehicle state management DB 500 is defined as db_vid, and the judgment result is defined as dec, the configuration judgment function part 251 may determine whether the keys can be exchanged or not using the judgment function f of Formula 7 below.

$$dec=f(vconf,db\_vid) \quad \text{Formula 7}$$

The function f is a binary function that returns 0 or 1. In a case where the function f returns 0, the configuration judgment function part 251 determines that the keys cannot be exchanged, and in a case where the function f returns 1, the configuration judgment function part 251 determines that the keys can be exchanged.

For example, the function f returns 1 only if all of the ECU models included in vconf and db_vid match, and the ECU version of vconf is either the same as or newer than the ECU version of db_vid, and returns 0 in any other cases. This way, the control server 200 allows the key exchange with the vehicle only if the ECU firmware version of the vehicle is the same as or newer than the vehicle configuration information stored in the vehicle state management DB 500.

The parameters vconf and db_vid used in the function f are not limited to the vehicle configuration information such as the ECU firmware version described above. It is also possible to determine whether the keys can be exchanged or not using the positional information of the vehicle, for example. Specifically, vconf may include the positional information indicating the current position of the vehicle, and db_vid may include information for identifying an appropriate location for the key exchange (such as a location where the key exchange is officially allowed). In a case where the current location of the vehicle is not an appropriate location for the key exchange such as a dealer or a maintenance facility, the function f may return 0 regardless of the rest of the vehicle configuration information.

This way, the configuration judgment function part 251 of the control server 200 can be configured so as to determine whether the vehicle is in an appropriate location for the key exchange such as a dealer or a maintenance facility or not, and to prohibit the key exchange with the vehicle in a case where the vehicle is not in the appropriate location. With this configuration, the control server 200 can prohibit the key exchange with a stolen vehicle. Furthermore, because it is possible to stop the vehicle from connecting to the network, the information retrieval by the vehicle can be limited, and automatic operation is disabled. Thus, use of the vehicle can be restricted.

In a case where the positional information of the vehicle configuration information (vconf) indicates that the vehicle is located within a certain radius from the appropriate location for the key exchange, the function f may return 1. This way, even if the positional information of the vehicle configuration information obtained from the vehicle was generated with a low degree of accuracy, it is still possible to determine whether keys can be exchanged or not accurately.

In a case where the configuration judgment function part 251 determines that the keys can be exchanged in Step 704, the controller 210 sets the key exchange flag column 512 of the record of the corresponding vehicle in the vehicle management table 510 of the vehicle state management DB 500 to 1 (Step 705). After Step 705, the key exchange flag setting phase 700a is ended.

In a case where the configuration judgment function part 251 determines that the keys cannot be exchanged in Step 704, the controller 210 sets the key exchange flag column 512 of the record of the corresponding vehicle in the vehicle management table 510 of the vehicle state management DB 500 to 0 (Step 710). After Step 710, the key exchange flag setting phase 700a is ended.

FIG. 8 is a flowchart of the key exchange phase 800 of the first embodiment.

First, the in-vehicle system 300 switches to the key exchange mode by the operation of the service terminal user via the input device 350 (Step 801). After Step 801, the controller 310 of the in-vehicle system 300 sends a key exchange requesting message to the control server 200 via the data transceiver 320 (Step 802). The key exchange requesting message includes the vehicle ID of the sender vehicle.

The controller 210 of the control server 200 obtains the value of the key exchange flag column 512 of a record in which the vehicle ID 511 matches the vehicle ID of the vehicle that sent the key exchange requesting message, from the vehicle management table 510 of the vehicle state management DB 500 (Step 803).

In a case where the key exchange flag is 1 in Step 803, the key exchange with the vehicle is possible, and therefore, the controller 210 of the control server 200 generates the first DH private key and the first DH public key using the DH key generation function part 242 of the encryption operation part 240 (Step 804).

Specifically, the DH key generation function part 242 randomly generates the first DH private key (x) using the method described above, and generates the first DH public key (y) using Formula 2 above and the public parameter g.

The controller 210 of the control server 200 generates a signature value for the first DH public key using the signature generation function part 241 of the encryption operation part 240 (Step 805). The signature generation function part 241 uses the first DH public key as the signature target data (m), and generates a signature value (s) using the control server private key 231 (sk) and Formula 1.

The controller 210 of the control server 200 sends the first DH public key and the signature value of the first DH public key to the in-vehicle system 300 via the data transceiver 220 (Step 806).

The controller 310 of the in-vehicle system 300 receives the first DH public key and the signature value thereof via the data transceiver 320, and verifies the signature value using the signature verification function part 361 of the encryption operation part 360 (Step 807). The signature generation function part 361 uses the first DH public key as the signature target data (m), and verifies the signature value (s) using the control server public key certificate 232 (cert) and Formula 4.

In a case where the signature verification is successfully conducted, or in other words, in a case where the combination of the first DH public key and the signature value is deemed proper in Step 807, the controller 310 of the in-vehicle system 300 generates the second DH private key and the second DH public key using the DH key generation function part 362 of the encryption operation part 360 (Step 808). The DH key generation function part 362 randomly generates the second DH private key (u) using the method described above, and generates the second DH public key (t) using Formula 5 above and the public parameter g.

The controller 310 of the in-vehicle system 300 sends the generated second DH public key to the control server 200 via the data transceiver 320 (Step 809). Then, the in-vehicle system 300 generates private information based on the first DH public key and the second DH private key using the DH private information generation function part 363 of the encryption operation part 360 (Step 810).

The DH private information generation function part 363 generates the private information (z) using the first DH public key (y), the second DH private key (u), and Formula 6.

The controller 210 of the control server 200 obtains the second DH public key from the in-vehicle system 300 via the data transceiver 220, and generates private information based on the second DH public key and the first DH private key, using the DH private information generation function part 243 of the encryption operation part 240 (Step 811). The DH private information generation function part 243 generates the private information (z) using the first DH private key (x), the second DH public key (t), and Formula 3.

Because the private information generated in Step 810 and the private information generated in Step 811 are the same, the control server 200 and the in-vehicle system 300 can securely share new private information in Step 810 and Step 811.

The controller 210 of the control server 200 sends a key exchange confirmation message to the in-vehicle system 300 via the data transceiver 220. The controller 210 updates the key exchange flag column 512 of the record corresponding to the sender vehicle of the second DH public key to 0 in the vehicle management table 510 of the vehicle state management DB 500 (Step 812).

The controller 310 of the in-vehicle system 300 receives the key exchange confirmation message from the control server 200 via the data transceiver 320, ends the key exchange mode, and enters the normal mode (Step 813). After Step 813, the key exchange phase 800 is ended.

In a case where the key exchange flag column 512 is 0 in Step 803, the controller 210 of the control server 200 sends a message indicating that the keys cannot be exchanged to the in-vehicle system 300 via the data transceiver 220 (Step 820).

In a case where the controller 310 of the in-vehicle system 300 receives the message indicating that the keys cannot be exchanged from the control server 200 via the data transceiver 320, the controller 310 ends the key exchange mode, and enters the normal mode (Step 821). After Step 821, the key exchange phase 800 is ended.

In a case where the signature verification failed, or in other words, in a case where the combination of the first DH public key and the signature value is deemed improper in Step 807, the controller 310 of the in-vehicle system 300 sends a message indicating that the keys cannot be exchanged to the control server 200 via the data transceiver 320. Thereafter, the controller 310 ends the key exchange mode, and enters the normal mode (Step 830).

In a case where receiving the message indicating that the keys cannot be exchanged via the data transceiver 220, the controller 210 of the control server 200 updates the key exchange flag column 512 of the record corresponding to the sender vehicle of the message to 0 in the vehicle management table 510 of the vehicle state management DB 500 (Step 831). After Step 831, the key exchange phase 800 is ended.

Explained below is the reason why the private information can be securely exchanged between the control server 200 and a vehicle in this embodiment. In order to securely perform key exchange, it is necessary that both the control server 200 and the vehicle are correct in the key exchange phase 800.

First, how to ensure the vehicle in the key exchange phase 800 is correct will be explained. In the key exchange phase 800, private information is stored in the vehicle. Thus, the key exchange flag column 512 corresponding to the vehicle needs to be set to 1. The key exchange flag column 512 can be set to 1 only during the key exchange flag setting phase 700a.

In a case where the key exchange flag column 512 is set to 1 in the key exchange flag setting phase 700a, a service terminal user, which is a worker or mechanic of a dealer or a maintenance facility that has access to the service terminal 400, registers the vehicle configuration information in the service terminal 400. Then, the service terminal user confirms that the registered vehicle configuration information matches the vehicle state management DB 500.

The worker or mechanic at the dealer or the maintenance facility physically accesses the vehicle, and obtains the vehicle configuration information by using the vehicle configuration management part 395.

Thus, as long as a worker or mechanic at a dealer or a maintenance facility performs the correct process, the key exchange flag column 512 is set to 1 only for the proper vehicle, not a false vehicle or illegally modified vehicle. That is, with the key exchange flag setting phase 700a and the key exchange phase 800 of the first embodiment, it is possible to ensure that the vehicle is the proper target of the key exchange.

Next, how to ensure the control server 200 in the key exchange phase 800 is a correct server for key exchange with the vehicle will be explained. The private information is stored in the control server 200 in the key exchange phase 800. In the key exchange phase 800, the control server 200 adds a signature value generated using the control server private key 231 to the first DH public key, and sends the key to the in-vehicle system 300.

The in-vehicle system 300 verifies the first DH public key and the signature value using the control server public key certificate 232 and the provided data. Thus, with the processes in the key exchange phase 800, it is possible to ensure that the in-vehicle system 300 exchanges keys with the correct control server 200.

As described above, in the first embodiment, the control server 200 and the in-vehicle system 300 can mutually ensure that one is the correct key exchange target of the other, and new private information can be exchanged securely. Specifically, in the first embodiment, the vehicle configuration information is input by a worker at a dealer or the like, and therefore, it is possible to prevent false communication by an unauthorized party, and as a result, the key exchange can be securely performed.

In this embodiment, the processes requiring manual operation in the key exchange flag setting phase 700a and the key exchange phase 800 are performed by the service terminal user, but for example, the driver or owner of the vehicle may perform the processes in the key exchange phase 800.

In this case, the controller 210 of the control server 200 may change the key exchange flag column 512, which was set to 1 in the key exchange flag setting phase 700a, to 0 after a prescribed period of time has passed. This makes it possible to limit a period of time in which the key exchange phase 800 can be conducted, which can reduce the possibility of the vehicle being swapped during a period between the key exchange flag setting phase 700a and the key exchange phase 800, and as a result, the key exchange can be performed more securely.

The storage part 330 of the in-vehicle system 300 stores therein the control server public key certificate 232, but may alternatively store a route certificate instead of the control server public key certificate 232. In this case, in Step 806, the controller 210 of the control server 200 sends the first DH public key, the signature value thereof, and the control server public key certificate 232 to the in-vehicle system 300.

In Step 807, the signature verification function part 361 of the in-vehicle system 300 verifies the provided control server public key certificate 232 with the route certificate, and in a case where the control server public key certificate 232 is deemed legitimate, verifies the signature value of the first DH public key with the control server public key certificate 232.

The information sharing system of this embodiment uses the DH key exchange algorithm as the key exchange algorithm, but the key exchange algorithm is not limited to this, and any key exchange algorithm may be used. Examples of different types of key exchange algorithm include the ECDH key exchange algorithm.

In this case, the DH key generation function part 242 of the control server 200 and the DH key generation function part 362 of the in-vehicle system 300 each correspond to an ECDH key generation function part, and the DH private information generation function part 243 of the control server 200 and the DH private information generation function part 363 of the in-vehicle system 300 each correspond to an ECDH private information generation function.

By using the DH key exchange algorithm, the information sharing system of this embodiment can perform key exchange more securely using the existing public key encryption algorithm, and can share private information.

In this embodiment, private information is shared by the key exchange between the control server 200 and the in-vehicle system 300, but the control server 200 and the in-vehicle system 300 can perform a secure encrypted communication using the common key encryption technology by generating a common key based on the private information. Also, through the encrypted communication using this common key, the control server 200 can send a private key of the public key encryption algorithm to the in-vehicle system 300.

The key exchange mode of the in-vehicle system 300 in this embodiment may include not only the key exchange between the control server 200 and the in-vehicle system 300, but also a process to be securely performed by the in-vehicle system 300 after the key exchange.

Examples of this process include a process to distribute an encrypted key from the controller 310 to each ECU. The key exchange mode is a mode of the in-vehicle system 300 in the key exchange phase 800, and as described above, the fact that the in-vehicle system 300 is correct is ensured. Thus, the processes during the key exchange mode can be securely conducted.

Second Embodiment

A second embodiment is a modification example of the first embodiment in which the processes of the key exchange flag setting phase 700a are different.

Figure 9:
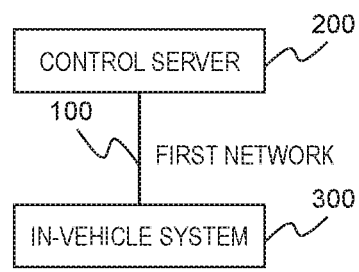
FIG. 9 is a block diagram illustrating an overall configuration of an information sharing system of a second embodiment.

FIG. 9 is a block diagram illustrating a overall configuration of the information sharing system of the second embodiment.

In the second embodiment, the control server 200 and the in-vehicle system 300 are connected to each other via the first network 100. The system of the second embodiment includes the control server 200, the in-vehicle system 300, and the first network 100. Unlike the first embodiment, the information sharing system of the second embodiment does not include the service terminal 400.

The control server 200, the in-vehicle system 300, and the first network 100 of the second embodiment have the same functions and the same function parts as those of the first embodiment.

In the second embodiment, the controller 310 of the in-vehicle system 300 has three operation modes: normal mode, configuration confirmation mode, and key exchange mode. The initial mode is the normal mode, and the mode switches to the configuration confirmation mode and the key exchange mode with an input made through the input device 350.

The chronological order up to the storage of the private information into a vehicle of the second embodiment is the same as the first embodiment, and is illustrated in FIG. 6. The information sharing system of the second embodiment performs the key exchange flag setting phase 700b instead of the key exchange flag setting phase 700a.

Figure 10:
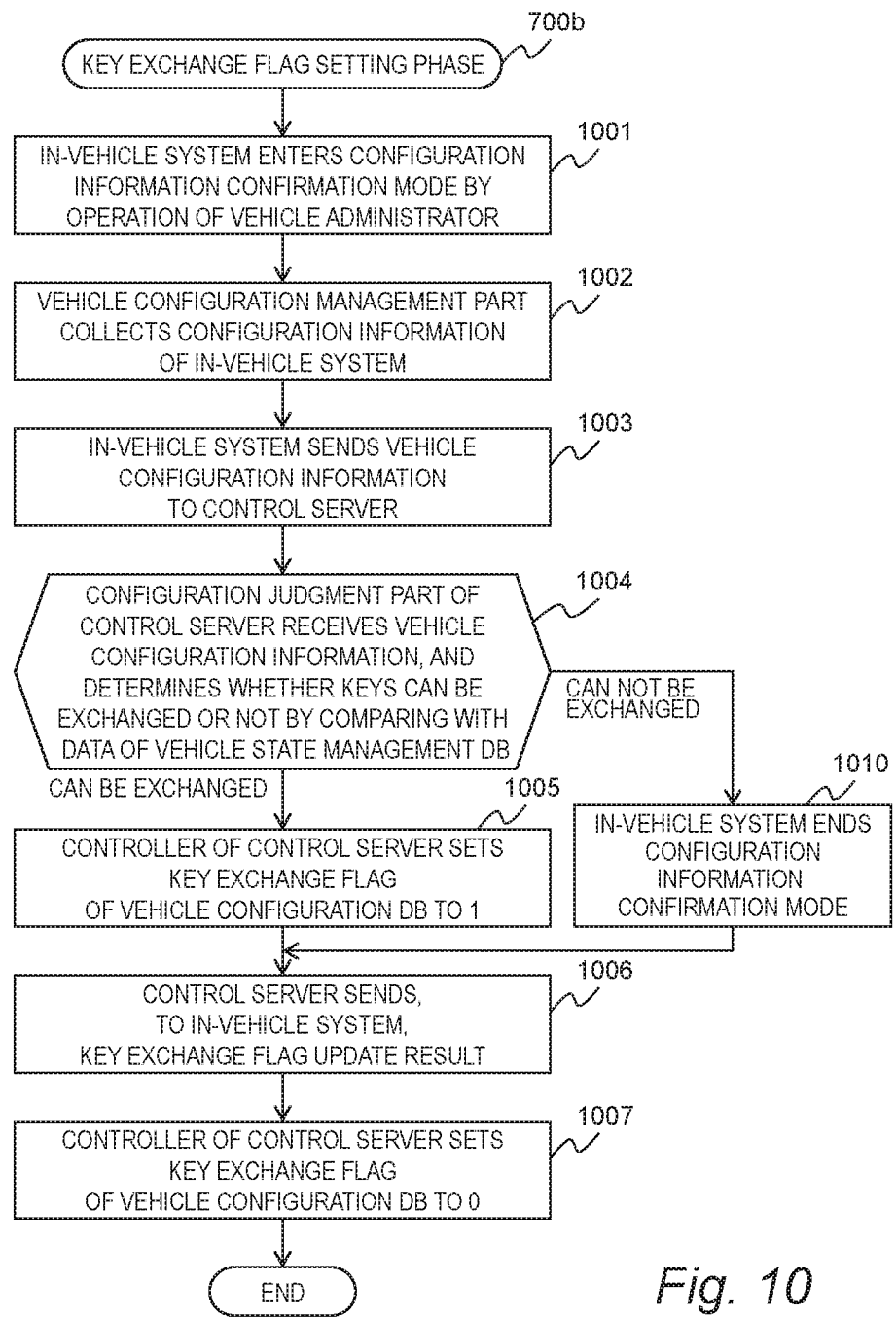
FIG. 10 is a flowchart of a key exchange flag setting phase of the second embodiment.

The procedure of the key exchange flag setting phase 700b of the second embodiment is illustrated in the flowchart of FIG. 10. The procedure of the key exchange phase 800 of the second embodiment is illustrated in the flowchart of FIG. 8, which is the same as the first embodiment.

FIG. 10 is a flowchart of the key exchange flag setting phase 700b of the second embodiment.

First, a vehicle administrator performs an operation to switch the in-vehicle system 300 to a configuration information confirmation mode via the input device 350 of the in-vehicle system 300. In a case where this operation is performed, the in-vehicle system 300 enters the configuration information confirmation mode (Step 1001).

The controller 310 of the in-vehicle system 300 collects the vehicle configuration information of the in-vehicle system 300 using the vehicle configuration control part 395 (Step 1002).

The controller 310 of the in-vehicle system 300 sends the vehicle configuration information to the control server 200 via the data transceiver 320 (Step 1003). The data transceiver 220 receives the vehicle configuration information.

The controller 210 of the control server 200 sends the vehicle configuration information retrieved through the data transceiver 220 to the configuration judgment part 250. The configuration judgment function part 251 determines whether the key exchange is possible or not using the provided vehicle configuration information and the data of the vehicle state management DB 500 (Step 1004). Step 1004 is the same as Step 704.

In a case where the configuration judgment function part 251 determines that the key exchange is possible in Step 1004, the controller 210 sets the key exchange flag column 512 of the record of the corresponding vehicle in the vehicle management table 510 of the vehicle state management DB 500 to 1. (Step 1005). Step 1005 is the same as Step 705.

Then the controller 210 of the control server 200 sends the updating result of the key exchange flag column 512 to the in-vehicle system 300 via the data transceiver 200 (Step 1006).

The in-vehicle system 300 receives the updating result of the key exchange flag column 512 via the data transceiver 320, ends the configuration information confirmation mode, and enters the normal mode (Step 1007).

In a case where the configuration judgment function part 251 determines that the key exchange is not possible in Step 1004, the controller 210 sets the key exchange flag of the record of the corresponding vehicle in the vehicle management table 510 of the vehicle state management DB 500 to 0 (Step 1010). Step 1010 is the same as Step 710. After Step 1010, the controller 210 proceeds to Step 1006.

In the description above, the in-vehicle system 300 was switched to the key exchange mode by the service terminal user in Step 801, but the switching method to the key exchange mode in the second embodiment is not limited to this.

For example, in Step 1007, after receiving the updating result of the key exchange flag column 512 and ending the configuration information confirmation mode, the in-vehicle system 300 may move to the key exchange phase, instead of the normal mode. The in-vehicle system 300 may directly proceed to Step 802.

In the second embodiment, the key exchange flag setting phase 700b and the key exchange phase 800 may be performed even if the service terminal 400 and the vehicle are not present in a specific location such as a dealer or a maintenance facility. This is because the service terminal 400 is not necessary in the processes of the second embodiment.

According to the first and second embodiments described above, the information sharing system of the present invention determines whether the keys can be exchanged or not based on the vehicle configuration information, and therefore, it is possible to exchange keys more securely. This makes it possible to exchange private information that has not been shared before between the control server 200 and the in-vehicle system 300 more securely.

Specifically, in the second embodiment, the access control for the operation to cause the in-vehicle system 300 to enter the configuration information confirmation mode is conducted in Step 1001. Thus, without using the service terminal 400, the keys can be exchanged securely between the in-vehicle system 300 and the control server 200.

Also, because it is not necessary to use the service terminal 400, work load by workers such as a dealer can be reduced.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. An information sharing system, comprising:
    a server; and
    an in-vehicle system that includes a vehicle configuration management part configured to collect configuration information for a vehicle in which said in-vehicle system is installed, where new confidential information is securely shared between the server and the vehicle without using confidential information provided to the vehicle in advance,
    wherein the server includes:
    a first storage part configured to store a server private key, and vehicle state management information indicating a state of the vehicle, the vehicle state management information being used to determine whether or not keys are exchanged with the in-vehicle system;
    a judgment part configured to compare the vehicle state management information with the configuration information to determine whether keys are exchanged with the in-vehicle system or not;
    a first key generation part configured to generate a first private key and a first public key, in a case where it is determined that keys are exchanged with the in-vehicle system; and
    a signature generation part configured to generate a signature value of the first public key using the server private key, and
    wherein the in-vehicle system further includes:
    a second storage part configured to store a public key certificate including a server public key;
    a signature verification part configured to verify the first public key and the signature value received from the server, using the public key certificate; and
    a second key generation part configured to generate a second private key and a second public key, in a case where a combination of the first public key and the signature value is correct as a result of the verification,
    wherein the first private key, the first public key, the second private key, and the second public key are generated and exchanged using the Diffie-Hellman key exchange method,
    wherein the server has a first private information generation part configured to generate private information using the first private key and the second public key, and
    wherein the in-vehicle system has a second private information generation part configured to generate private information using the second private key and the first public key.

2. The information sharing system according to claim 1, further comprising a terminal to which the configuration information is provided,
    wherein the terminal includes a vehicle configuration registration part configured to send the input configuration information to the server.

3. The information sharing system according to claim 1,
    wherein the vehicle state management information includes information to identify a location for the vehicle to exchange keys, and
    wherein the judgment part is configured to:
    determine whether the vehicle is present in a location for key exchange or not; and
    determine that the keys are exchanged with the in-vehicle system in a case where the vehicle is present in the location for key exchange.

4. A computer configured to communicate with an in-vehicle system, comprising:
    a storage part configured to store a server private key, and vehicle state management information indicating a state of the vehicle, the vehicle state management information being used to determine whether keys are exchanged with the in-vehicle system or not;
    a judgment part configured to compare the vehicle state management information with a configuration information to determine whether keys are exchanged with the in-vehicle system or not;
    a key generation part configured to generate a first private key and a first public key, in a case where it is determined that keys are exchanged with the in-vehicle system; and
    a signature generation part configured to generate a signature value of the first public key using the server private key,
    wherein the computer sends the first public key and the signature value to the in-vehicle system,
    wherein the computer receives, from the in-vehicle system, a second public key generated in a case where a combination of the first public key and the signature value is correct,
    wherein new confidential information is securely shared between the server and the vehicle without using confidential information provided to the vehicle in advance,
    wherein the first private key, the first public key, a second private key, and the second public key are generated and exchanged using the Diffie-Hellman key exchange method, wherein the server has a first private information generation part configured to generate private information using the first private key and the second public key, and wherein the in-vehicle system has a second private information generation part configured to generate private information using the second private key and the first public key.

5. The computer according to claim 4,
wherein the computer is configured to receive the configuration information from a terminal.

6. The computer according to claim 4,
wherein the vehicle state management information includes information to identify a location for the vehicle to exchange keys, and
wherein the judgment part is configured to:
determine whether the vehicle is present in a location for key exchange or not; and
determine that the keys are exchanged with the in-vehicle system, in a case where the vehicle is present in the location for key exchange.

7. An information sharing method by an information sharing system that includes a server and an in-vehicle system,
wherein the server includes a first processor configured to execute programs and a first storage device configured to store the programs,
wherein the first storage device is configured to store a server private key, and vehicle state management information indicating a state of the vehicle, the vehicle state management information being used to determine whether keys are exchanged with the in-vehicle system or not,
wherein the in-vehicle system includes a second processor configured to execute programs and a second storage device configured to store the programs,
wherein the second storage device is configured to store a public key certificate including a server public key, and
wherein the information sharing method comprises:
a step in which the in-vehicle system collects configuration information for a vehicle that has the in-vehicle system installed therein;
a step in which the server receives the configuration information;
a determinant step in which the server compares the vehicle state management information with the configuration information to determine whether keys are exchanged with the in-vehicle system or not;
a step in which the server generates a first private key and a first public key, in a case where it is determined that keys are exchanged with the in-vehicle system;
a step in which the server generates a signature value of the first public key using the server private key;
a step in which the server sends the first public key and the signature value to the in-vehicle system;
a step in which the in-vehicle system verifies the first public key and the signature value received from the server, using the public key certificate;
a step in which the in-vehicle system, in a case where a combination of the first public key and the signature value is deemed correct as a result of the verification, generates a second private key and a second public key; and
a step in which the in-vehicle system sends the generated second public key to the server,
wherein new confidential information is securely shared between the server and the vehicle without using confidential information provided to the vehicle in advance,
wherein the first private key, the first public key, the second private key, and the second public key are generated and exchanged using the Diffie-Hellman key exchange method,
wherein the server has a first private information generation part configured to generate private information using the first private key and the second public key, and
wherein the in-vehicle system has a second private information generation part configured to generate private information using the second private key and the first public key.

8. The information sharing method according to claim 7,
wherein the information sharing system further includes a terminal to which the configuration information is provided, and
wherein the information sharing method further comprises a step in which the server receives the configuration information from the terminal.

9. The information sharing method according to claim 7,
wherein the vehicle state management information includes information to identify a location for the vehicle to exchange keys, and
wherein the judgment step performed by the server includes:
determining whether the vehicle is present in a location for key exchange, using the vehicle state management information and a location of the vehicle included in the configuration information; and
determining that the keys are exchanged with the in-vehicle system, in a case where it is determined by the server that the vehicle is present in the location for key exchange.

* * * * *